July 17, 1956 — F. J. EISELE — 2,755,034

FISHING REEL BRAKE

Filed June 9, 1955

Frank J. Eisele
Inventor
Koenig and Pope
Attorneys

2,755,034

FISHING REEL BRAKE

Frank J. Eisele, St. Louis, Mo.

Application June 9, 1955, Serial No. 514,268

9 Claims. (Cl. 242—84.5)

This invention relates to fishing reel brakes, and with regard to certain more specific features, to a brake of this type which is in the form of a removable attachment for the reel.

Among the several objects of the invention may be noted the provision of a simple and compact fishing reel brake which may be conveniently attached and detached to the spacing pillars of standard fishing reels; the provision of such a brake which applies friction directly to the spooled line, so as to operate not only as a brake upon casting but to improve the lay of the line as it is spooled in; and the provision of a brake of the class described which will not damage the line and which provides for moderate braking pressure at various spool diameters. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a top plan view of a fishing reel showing the brake applied thereto, and in dotted lines removed therefrom;

Corresponding reference characters indicate corresponding parts throughout the several views of the drawings.

Figure 1:
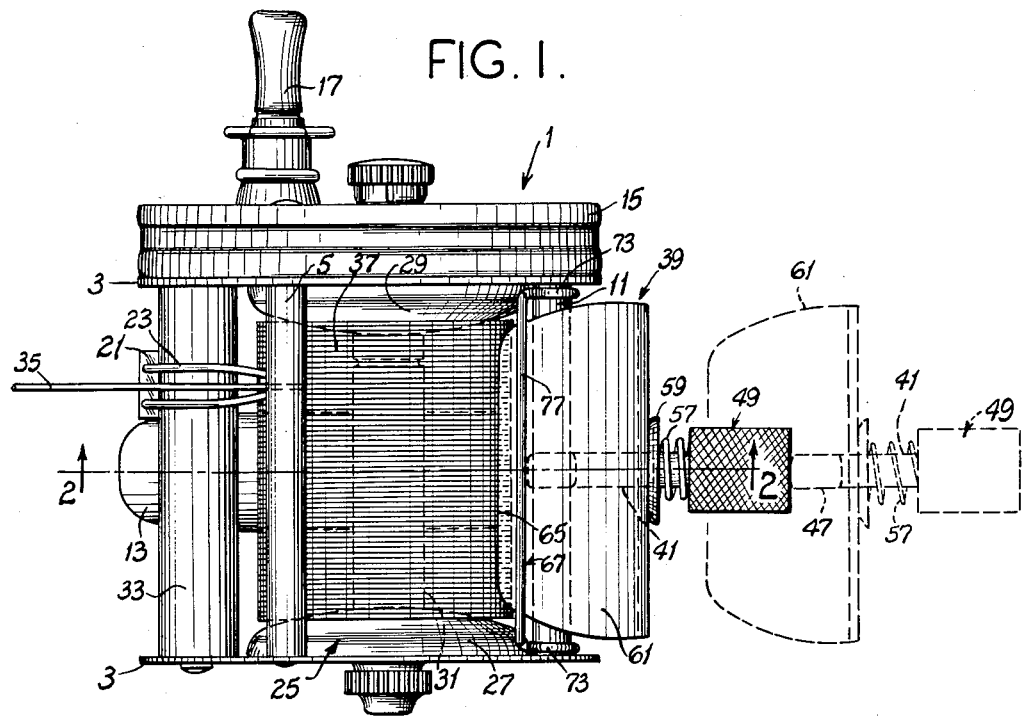

Referring now more particularly to the drawings, a usual fishing reel is shown in general at numeral 1. This is constituted by end plates 3 held in spaced relation by spacing pillars 5, 7, 9 and 11 (for example). Pillars 7 and 9 carry a saddle 13 for attachment of the reel to a suitable pole (not shown). On one plate 3 is a gear box 15 in which is carried the usual gear train (not shown) connecting an outside crank 17 with the usual reverse-threaded lead screw 19 engaged by a nut 21 which is reciprocably driven by the lead screw 19.

The nut 21 carries the usual hairpin-shaped line-winding guide 23. The gear train also connects with, and drives spool 25 which has end flanges 27, 29 and a central core 31. A guard plate 33 covers the screw 19 and nut 21. The end of the guide 23 slides in a groove 34 of the pillar 5. Fishing line is shown at 35, extending from a spooled portion 37. The spooled portion is shown as being of relatively large diameter in Figs. 1 and 2, as is the case when a substantial length of line is employed. In Fig. 3 the spooled portion 38 is of a smaller diameter, as when a smaller length of line is used.

The brake assembly is shown in general at numeral 39 and consists of a bifurcated post 41 suitably tempered so that its legs 43 are of a springing nature. The legs joint at a threaded portion 45. At their free ends the legs 43 are formed with jaw ends 47, so that by pushing the post 41 toward one of the spacing pillars 11, it will become springingly clipped thereto. At numeral 49 is shown a knurled nut, consisting of an internal threaded portion 51 having on one side of it an unstepped socket 53 and on the other side of it a stepped socket 55.

Figure 2:
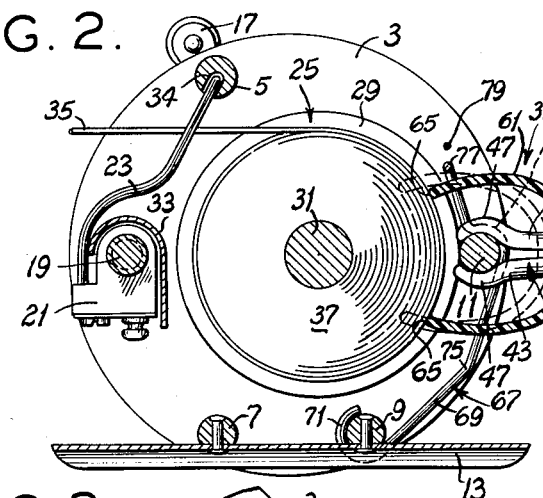
Fig. 2 is a cross section taken on line 2—2 of Fig. 1.
Figure 3:
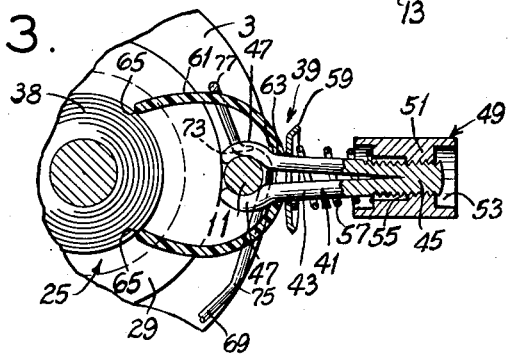
Fig. 3 is a fragmentary view similar to Fig. 2, showing an alternative application of certain parts; and, Fig. 4 is a perspective view of a detachable bail.
Figure 4:
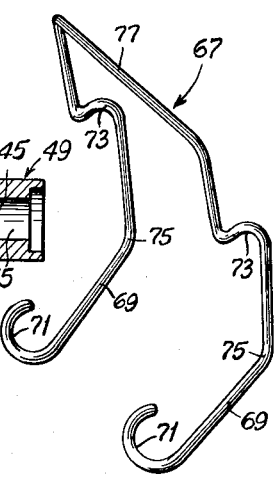

Referring to Fig. 2, there is located in the socket 53 a compression spring 57 which at one end abuts the bottom of the socket and at the other end abuts a washer 59. At numeral 61 is shown a trough-shaped brake shoe, composed preferably (though not necessarily) of plastic material such as methyl methacryolate resin, sometimes called "Lucite" in trade. It has a relatively large opening 63 through which the post 41 passes loosely. Thus in the position of parts shown in Fig. 2, the spring biases the shoe 61 to the left. The parallel margins 65 of the shoe 61 engage the line spool 37. To vary the brake pressure, the nut 49 is appropriately turned.

The opening 63 is sufficiently larger than the post 41 so that the shoe may rock freely. In order to prevent the shoe 61 from twisting excessively around the axis of the post 41, I provide the detachable bail 67. This is composed of a piece of spring wire formed with side legs 69 having hooks 71 for engagement with pillar 9 and detent portions 73 for snap engagement with pillar 11. The legs 69 are bent, as shown at 75, to provide sufficient springing action to hold the bail in position when clipped into position, as shown in Fig. 2. The legs 69 are joined by a cross wire 77 which parallels one side of the brake shoe. This acts as a guide bar to prevent the shoe 61 from twisting excessively around the axis of the post 41. However, some twisting action is allowed so that the margins 65 may adjust to the surface of spool 37. The bail 67 is easy to apply by applying the hooks 71 to pillar 9 and pressing at 75 to snap the detents 73 into engagement with the pillar 11. It may be mentioned that in some heavy-duty forms of reels, as in surf reels, there is no requirement for a bail such as 67, because such reels generally have an additional spacing pillar at about a point such as indicated by the dot 79. Thus this type of pillar will function in such reels as a lateral guide for the brake shoe 61.

Operation will be clear from the above. When a cast is made and the plug draws the line 35 from the spool 37, the latter rotates. The parallel linear margins 65 of the shoe 61 apply friction to the spooled line 37, so as to prevent overrun. As the spool diameter decreases, the brake shoe follows under pressure from the spring 57.

It sometimes occurs that a fisherman does not have a full spool of line such as shown at 37 in Fig. 2. In such event the nut 49 may be reversed on the threaded portion 45 of the post 41. The stepped socket 55 then backs the spring at a point closer to the pillar 11 than is the case in Fig. 2. Consequently, more spring pressure may be obtained than would otherwise be possible at smaller spool diameters.

It is apparent from the above that the brake is useful not only to prevent overrun of a cast line, but also to provide pressure on incoming lines, so as to improve the neatness and compactness of the spool windings.

An advantage of the detachability of the brake assembly 39 is that it may be removed and be entirely out of the way when it is desired to apply a new spool of line, or otherwise service the reel. Moreover, since the grip of the jaw ends 47 on the pillar 11 is frictional, the brake assembly has some ability to give by angling up or down from the position shown in Figs. 2 and 3 so that it is less likely to catch in clothing or on surrounding objects.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A brake for a fishing reel having a spool and a spacing pillar, comprising an extension from said pillar, a trough-shaped brake shoe having margins engageable with a spool of line on the spool and straddling said pillar, said shoe having an opening between said margins, said extension passing through said opening, an adjusting member on said extension and resilient means reacting between the adjusting member and the brake shoe.

2. A brake for a fishing reel made according to claim 1, wherein said extension includes detent means on its end opposite said adjusting member adapted for detachable engagement with said pillar.

3. A brake for a fishing reel made according to claim 1, including a guide bar extending from one side to the other of the reel parallel to said spacing pillar and located outside of the trough shape of the brake shoe.

4. A brake for a fishing reel having a spool and a spacing pillar, comprising a post extending from said pillar, a trough-shaped brake shoe having margins engageable with a spool of line on the spool and straddling said pillar, said shoe having an opening between said margins, said post passing through said opening, an adjusting nut threaded to said post, and a spring reacting between the nut and the brake shoe.

5. A brake for a fishing reel made according to claim 4, wherein said post includes detent means on its end opposite said nut for detachable engagement with said pillar.

6. A brake for a fishing reel made according to claim 4, wherein said post is split to form spring legs having opposite gripping jaws adapted for detachable spring engagement with said pillar.

7. A brake for a fishing reel made according to claim 4, including a guide bar extending from one side to the other of the reel parallel to said spacing pillar and located outside of said trough shape of the brake shoe.

8. A brake for a fishing reel made according to claim 7, wherein said guide bar constitutes the cross member of a spring bail having lateral legs formed with end hooks engageable with another spacing pillar on the reel and detents adapted to be snapped onto the spacing pillar which carries said post so as to place the cross member next to and outside of the trough shape of said brake shoe.

9. A brake for a fishing reel made according to claim 4, wherein said nut is adapted to be reversibly threaded to said post, said nut having contact points with the spring which are at different distances from its position of threaded engagement with the post.

No references cited.